(12) United States Patent
Westley et al.

(10) Patent No.: US 7,137,282 B2
(45) Date of Patent: Nov. 21, 2006

(54) LASER SHOCK PEENING

(75) Inventors: Jacquelyn A. Westley, Newport (GB); Dean Jones, Bristol (GB); Ian Andrews, Derbyshire (GB)

(73) Assignee: Rolls-Royce plc, London (GB)

( * ) Notice: Subject to any disclaimer, the term of this patent is extended or adjusted under 35 U.S.C. 154(b) by 308 days.

(21) Appl. No.: 10/760,527

(22) Filed: Jan. 21, 2004
(Under 37 CFR 1.47)

(65) Prior Publication Data
US 2004/0226928 A1    Nov. 18, 2004

(30) Foreign Application Priority Data
Feb. 4, 2003   (GB) .................. 0302554.1

(51) Int. Cl.
   *C21D 7/06* (2006.01)
(52) U.S. Cl. .................... 72/53; 72/56; 219/121.73
(58) Field of Classification Search ............ 72/53; 219/121.72, 121.74, 121.75
   See application file for complete search history.

(56) References Cited

U.S. PATENT DOCUMENTS

| 5,131,957 A | 7/1992 | Epstein et al. |
| 5,911,890 A * | 6/1999 | Dulaney et al. ....... 219/121.85 |
| 5,935,464 A * | 8/1999 | Dulaney et al. ....... 219/121.65 |
| 2002/0050157 A1 * | 5/2002 | Kennerknecht et al. ...... 72/53 |

FOREIGN PATENT DOCUMENTS

| EP | 0 933 438 A1 | 8/1999 |
| EP | 1 122 321 A2 | 8/2001 |
| EP | 1 227 164 A2 | 7/2002 |
| WO | WO 97/41266 | 11/1997 |

* cited by examiner

*Primary Examiner*—Lowell A. Larson
*Assistant Examiner*—Debra Wolfe
(74) *Attorney, Agent, or Firm*—Oliff & Berridge, PLC

(57) ABSTRACT

In a laser shock peening process, the shape of the spot generated by the laser beam is changed on the fly. This is achieved, for example, by a masking device which is movable into and out of the path of the laser beam. Laser shock peening spots can consequently be shaped so as to avoid the spots overlapping an edge of the workpiece, or any other feature which may be damaged by the laser energy.

14 Claims, 2 Drawing Sheets

LASER SHOCK PEENING

TECHNICAL FIELD OF THE INVENTION

This invention relates to a laser shock peening process, apparatus for carrying out the process, and a component having a laser shock peened surface.

BACKGROUND OF THE INVENTION

Laser shock peening is a known technique for generating compressive stresses in the surface of a component using laser energy. A laser shock peening process is disclosed in U.S. Pat. No. 5,131,957, the disclosure of which is incorporated herein by reference. In a typical laser peening process, the workpiece to be treated is coated first with an opaque layer, such as black paint, and subsequently covered with a transparent layer, which may be water. A pulsed laser beam is directed at the workpiece through the transparent layer. When the beam strikes the opaque layer, the laser energy vaporises the opaque layer, converting it into plasma and causing an explosive impact to be applied to the surface of the workpiece. The transparent layer provides a reaction element, increasing the force of the explosive impact on the surface of the workpiece.

The impact applied by the vaporised part of the opaque layer causes a shock wave to propagate into the surface of the workpiece. This causes plastic deformation of the material of the workpiece in its surface region, resulting in an induced compressive stress adjacent the surface. This induced compressive stress increases the resistance of the workpiece to crack formation and propagation.

Each pulse of the laser irradiates an area of the workpiece or "spot" which may have a diameter, or equivalent dimension, of 2 to 15 mm. In practice, successive pulses are applied to the workpiece in an overlapping, or closely spaced, relationship in order to cover the full extent of that region of the workpiece surface which is to be treated. For reasons of efficiency, the laser beam is manipulated to cause the shape of the spot to have rectilinear edges in order to avoid or minimise overlap, while leaving no untreated regions between adjacent spots. For example, square or hexagonal spot shapes may be used.

If laser shock peening is carried out around the edge of a workpiece, for example around a hole drilled in the workpiece or at a free edge, such as a trailing edge of a turbine blade of a gas turbine engine, problems can arise. Peening around holes such as turbine cooling holes can cause the surrounding material to "slump" into the holes, so restricting their apertures. Peening at blade edges can damage coatings, such as protective coatings, applied to the blade, and cause degradation of edge detail. It is consequently desirable to avoid applying laser peening spots which extend over such edges, while adequately covering the full area over which treatment is required. It is difficult to achieve this if all of the spots have the same shape.

SUMMARY OF THE INVENTION

According to one aspect of the present invention, there is provided a laser shock peening process in which a laser beam is directed at a surface of a workpiece to generate a plurality of laser shock peened spots on the workpiece, at least one of the laser shock peened spots having a shape different from that of others of the laser shock peened spots.

The shape of the spots may be changed during the laser shock peening process by changing the cross-sectional shape of the laser beam. This may be done by selectively introducing an appropriate shape-defining element in the path of the laser beam between the laser and the workpiece when spots of the respective shape are required. Alternatively, a variable geometry shape-defining element may be disposed permanently in the path of the laser beam, in which case the method comprises changing the geometry of the shape-defining element for the purpose of generating laser shock peened spots of different shape.

The shape defining element may comprise a mask. In a preferred embodiment, a single mask may comprise a plurality of apertures having shapes different from each other. The mask may be displaced between adjacent pulses in order to position an appropriately shaped aperture in the path of the laser beam so as to generate, at each pulse, a spot of the desired shape on the workpiece.

Alternatively, the shapes of the spots may be changed by inserting an appropriate one of a plurality of different masks in the path of the laser beam.

In a preferred embodiment of the invention, a first spot shape is used predominantly over an area of the workpiece to be treated, while a second spot shape is used at at least some edge regions of the area to be treated, so as to avoid the possibility of the laser beam directly striking an edge of the workpiece. The first shape may, for example, be rectangular, and in particular square, while the second shape may be a common geometrical shape, for example a triangle, or may be a custom shape created to conform to the requirements of a specific workpiece. For example, the second shape may have a curved edge, or a re-entrant edge, so as to conform to the shape of a particular edge portion of the workpiece.

According to another aspect of the present invention, there is provided laser shock peening apparatus comprising a laser and a selectively operable device for changing the shape of a spot generated by the laser beam on a workpiece during a laser shock peening operation.

The selectively operable means may comprise a mask which is movable into and out of the path of laser beam, the mask having an aperture corresponding to the desired spot shape. A plurality of different masks may be provided, the masks having differently shaped apertures from each other.

In an alternative embodiment, a variable-geometry shape-defining element, such as an aperture device, may be provided in, or movable into, the path of the laser beam.

The present invention also provides a component which has been shock peened by means of a process or apparatus as defined above. Thus, according to a third aspect of the present invention, there is provided a component having a laser shock peened surface comprising a plurality of laser shock peened spots, at least one of the laser shock peened spots having a shape different from that of others of the laser shock peened spots.

In a typical embodiment of such a component, the laser shock peened surface may comprise predominantly spots of a first shape, for example rectangular, and at least one laser shock peened spot, for example at a perimeter region of the surface, having a second shape. The perimeter region of the surface may be at or close to an edge of the component. Alternatively, the perimeter region of the surface may be at or close to a hole or other formation in the surface.

For a better understanding of the present invention, and to show more clearly how it may be carried into effect, reference will now be made, by way of example, to the accompanying drawings, in which:

BRIEF DESCRIPTION OF THE INVENTION

DETAILED DESCRIPTION OF THE INVENTION

Figure 1:
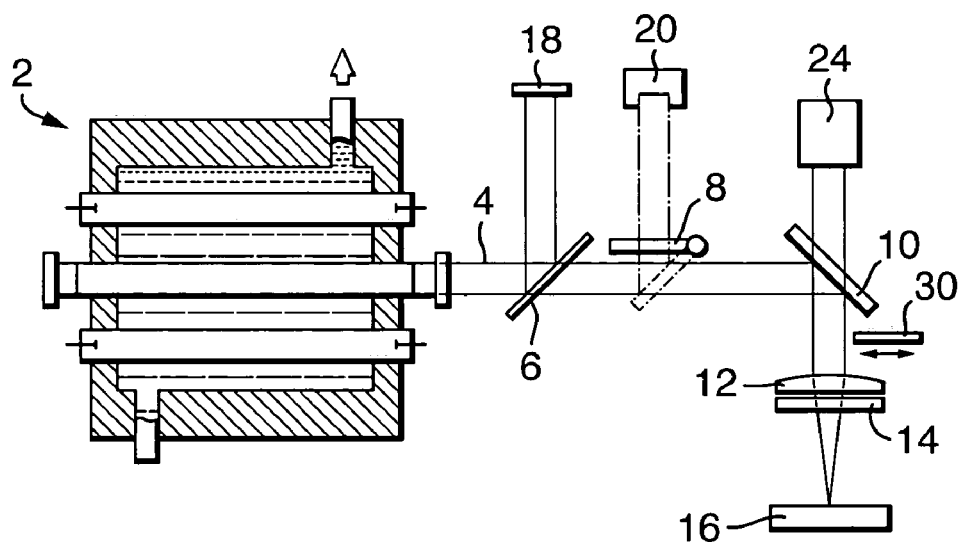
FIG. 1 is a diagrammatic representation of laser shock peening apparatus.

The apparatus shown in FIG. 1 comprises a laser 2, for example a NdYAG laser, which emits a laser beam 4. The beam 4 passes through a partially reflective mirror 6 and a shutter 8 to a 45° mirror 10. The mirror 10 deflects the beam through 90°, following which it passes through a focussing lens 12 and a cover slide 14 to a workpiece 16.

The partially reflective mirror 6 transmits most of the beam 4, but reflects some of the laser light to an energy monitor 18. The shutter 8 is flipped into and out of the path of the beam 4 to provide a pulsed beam at the workpiece 16. When the shutter 8 is in the path of the beam, it reflects the beam to an energy dump 20.

A closed circuit TV camera is provided for monitoring the laser shock peening operation through the mirror 10 and the focussing lens 12.

As shown in FIG. 1, the laser beam is focussed by the focussing lens 12 and directed onto the surface of the workpiece 16. In practice, however, as shown in FIG. 2, the laser beam 4 is defocussed at the surface of the workpiece, so that each laser pulse provides a laser shock peening spot 26 which may, for example, have a dimension in the lane of the treated surface of 2.5 to 7 mm.

Figure 2:
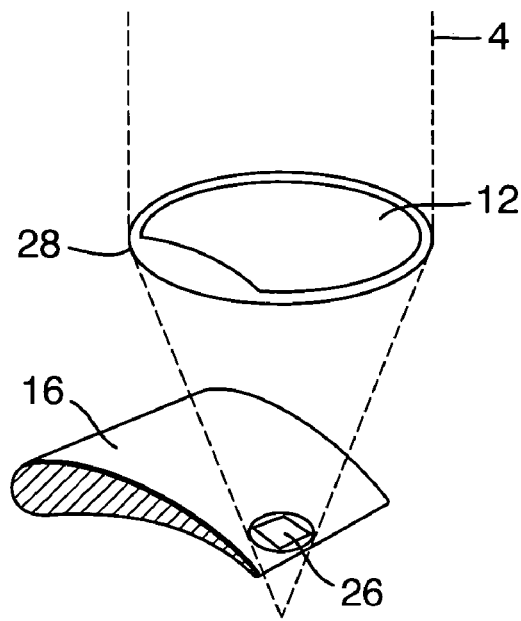
FIG. 2 represents the formation of a laser spot on a workpiece during a laser shock peening operation.

As shown in FIG. 2, the focussing lens 12 is masked over an area 28 to leave a generally square transparent area. Consequently, the laser beam emerging from the lens 12 has a square cross-section, which achieves the square spot 26.

To perform a laser shock peening operation, the surface of the workpiece 16 to be treated is coated with an opaque material, such as black paint, over which a transparent reaction material is provided. The transparent reaction material may, for example, comprise a film of water. The workpiece 16 is positioned in the path of the laser beam as shown in FIG. 1, and is supported on a displacement carriage so that the workpiece can be moved transversely relatively to the laser beam 4.

The laser shock peening operation is performed by directing pulses of laser energy at the workpiece 16. Each pulse irradiates a small area of "spot" on the workpiece and the energy in the laser beam causes the opaque material in and adjacent to that area to vaporise to form a plasma, so causing an explosive impact on the surface of the workpiece to generate compressive stress in the surface region. After each pulse, the workpiece 16 is displaced to present a new area of the surface to the subsequent laser pulse. In this manner, a succession of laser pulses covers the entire surface of the workpiece 16 over which treatment is required.

As an alternative to displacement of the workpiece 16, the optics of the laser may provide a traversing facility, so that the workpiece may remain stationary while the laser beam is directed to provide a succession of spots at different positions on the workpiece 16.

The generally square shape of the beam created by the masked area 28 of the focussing lens 12 means that adjacent laser spots can be packed efficiently, so that there is minimal overlapping of spots while the full surface to be treated is covered without any unpeened regions being left between adjacent spots.

Some regions of the workpiece, for example leading and trailing edges of compressor or turbine blades of a gas turbine engine, are vulnerable to distortion or damage if a laser spot overlaps the edge. This is particularly the case if these regions are coated. Similarly, some features of a workpiece, for example cooling holes formed in the surface of a compressor or turbine blade of a gas turbine engine, can be damaged or distorted if a laser spot falls on them. For this reason, it is desirable not to use the square laser beam shape for laser shock peening spots in the close vicinity of such edges or features. For example, in some circumstances, an edge of a workpiece 16 may extend obliquely to the adjacent edge of a square laser shock peening spot 26, and, if another square spot 26 is applied next to the existing one, the new spot 26 would include the edge of the workpiece 16. In such circumstances, in order to avoid damage to the edge, it would be desirable for the laser shock peening spot 26 closest to the edge to have one side parallel to the workpiece edge and an opposite edge parallel to the edge of the adjacent square spot 26. Then the first side of the spot can run parallel to, but spaced from, the workpiece edge.

In order to enable differently shaped spots 26 to be formed, a masking device may be provided in path of the laser beam 4 in order to shape the beam as required for any particular laser shock peening spot. For example, as shown in FIG. 1, a masking device 30 may be selectively movable into and out of the path of the laser beam 4 between the 45° mirror 10 and the focussing lens 12. Thus, if a normal, square, spot 26 is to be formed, the masking device 30 will be in the position shown in FIG. 1, away from the laser beam 4. However, if a different shape of spot 26 is required, ie a shape other than square, then the masking device 30 is displaced into the path of the laser beam 4 so that the alternative shaped spot 26 is formed.

It will be appreciated that the masking device 30 may also be used to create a square spot 26 of smaller size than is achieved by the masking 28 on the focussing lens 12, and possible in a different orientation. For the purposes of this specification, two spots having similar outlines but of different size or orientation are considered to have a different shape from each other.

In some applications, it may be desirable for there to be more than one alternative spot shape. Consequently, a plurality of masking devices 30 may be provided, with an appropriate one being selected for insertion into the path of the laser beam 4 to achieve the desired spot shape for any particular pulse. In another alternative, differently shaped apertures may be formed in a single masking device 30, with the masking device 30, which may be in the form of a rotatable disk, being indexed as required to present the appropriately shaped aperture into the path of the laser 4.

As indicated above, the masking device 30 may simply provide one or more apertures which define the shape of the spot 26 required. As an alternative, a single masking device 30 may be provided, which may be permanently situated in the path of the laser beam 4, the masking device 30 in this case having a variable-geometry aperture. For example, the variable-geometry aperture may be constructed from a plurality of individually movable leaves which can be adjustable relatively to each other so as to provide apertures of different shapes and sizes, somewhat in the manner of a conventional optical iris.

The present invention thus provides the ability to adjust the shape of the area irradiated by the laser beam during the progress of a laser shock peening operation. This ability to change the shape of the laser shock peened spot 26 "on the fly" provides an efficient process for conducting a laser shock peening operation on a workpiece which can cover the entire surface which needs to be treated while avoiding damage resulting from stray laser energy.

It will be appreciated that the operation of the masking device 30, as well as other aspects of the laser shock peening operation, is conveniently performed under computer control.

Figure 3:
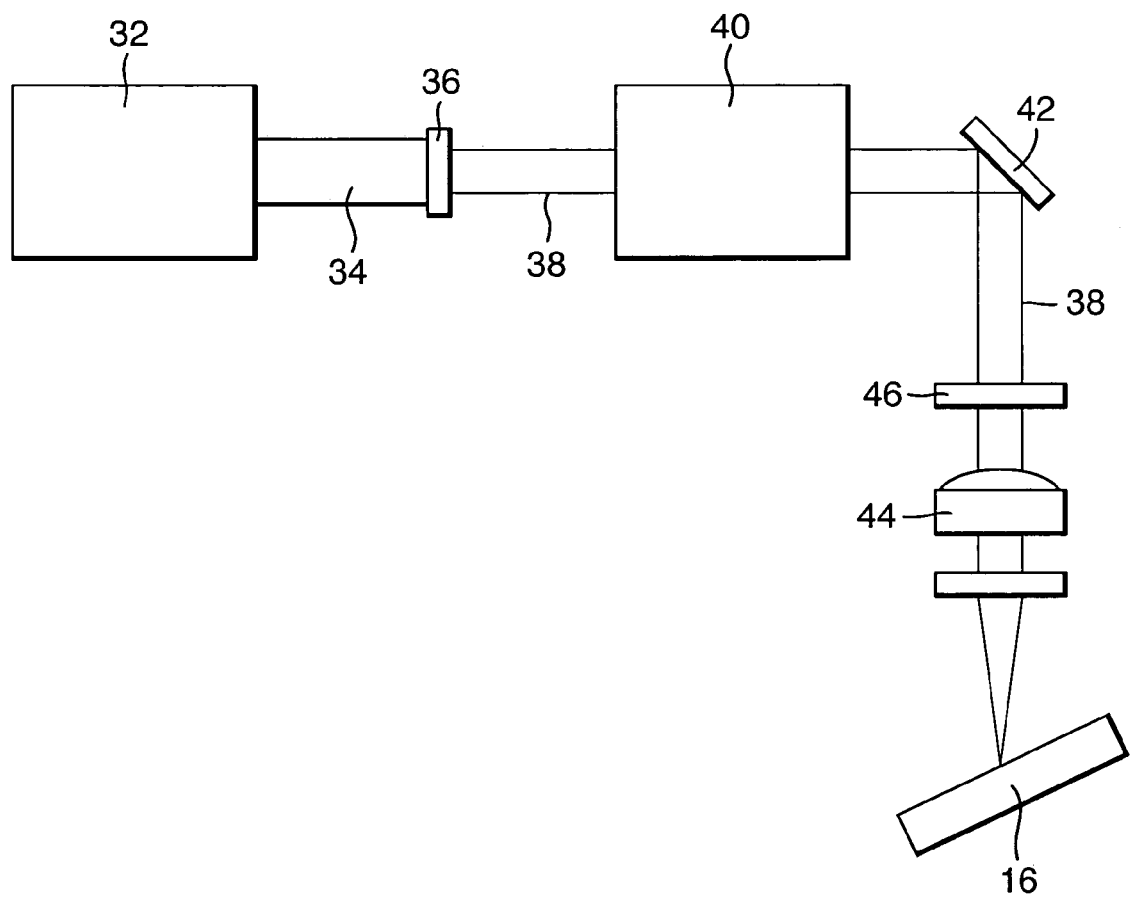
FIG. 3 is a diagrammatic representation of an alternative embodiment of laser shock peening apparatus according to the present invention.

FIG. 3 shows an alternative embodiment of laser shock peening apparatus according to the present invention. The apparatus shown in FIG. 3 comprises a laser 32, for example a NdYAG laser, which emits a laser beam 34. The beam 34 passes through a mask 36, which performs the same role as the masked focussing 12 of the apparatus shown in FIG. 1. The mask is shaped to create a laser beam of square cross-section (henceforth square beam 38) which passes to an amplification means 40 where it is amplified and its coherence improved. Such amplification means 40 are well known in the art and will not be discussed further herein. After passing through the amplification means 40, the beam 38 is relayed via a mirror 42 to the focussing optics 44 which focus the beam 38 on to the workpiece 16. Interposed between the amplification means 40 and the focussing optics 44 are further masking means 46 equivalent to the masking means 30 of the apparatus shown in FIG. 1.

The operation of the apparatus of FIG. 3 is essentially the same as that of the apparatus of FIG. 1. However, the revised geometry allows the mask 36 to be placed in such a position on the laser beam path that the concentration of laser energy falling on the mask 36 is reduced and hence its longevity is increased. It will be understood that the further masking means 46 could be similarly repositioned to a location between the laser 32 and laser amplification means for similar reasons.

The invention claimed is:

1. A laser shock peening process in which a laser beam is fired at a surface of a workpiece to generate a plurality of laser shock peened spots on the workpiece, at least one of the laser shock peened spots having a shape different from that of others of the laser shock peened spots, and in which a selectively operable shape defining device is disposed in the path of the laser beam in order to achieve the different shape.

2. A laser shock peening process as claimed in claim 1, in which the selectively operable shape defining device is moved into and out of the path of the laser beam to change the shape of the spots.

3. A laser shock peening process as claimed in claim 1, in which the geometry of the selectively operable shape defining device is changed to change the shape of the spots.

4. A laser shock peening process as claimed in claim 1, in which a further shape defining device is provided in the path of the laser beam for creating the shape of the said others of the laser shock peened spots.

5. A laser shock peening process as claimed in claim 1, in which the laser shock peened spots are generated so as to cover substantially the full extent of a treated area, the laser shock peened spots predominantly having a first shape, with at least one of the laser shock peened spots in the perimeter region of the treated area having a second shape different from the first shape.

6. A laser shock peening process as claimed in claim 5, in which the first shape is rectangular.

7. Laser shock peening apparatus comprising a laser and a selectively operable device for changing the shape of a spot generated by the laser beam on a workpiece during a laser shock peening operation.

8. Laser shock peening apparatus as claimed in claim 7, in which the selectively operable device comprises a mask which is selectively movable into and out of the path of the laser beam.

9. Laser shock peening apparatus as claimed in claim 8, in which the mask is one of a plurality of different masks for generating respective differently shaped spots.

10. Laser shock peening apparatus as claimed in claim 8, in which the mask is provided with a plurality of different shaped apertures for generating respectively differently shaped spots, the mask being indexable to present a selected one of the apertures in the path of the laser beam.

11. Laser shock peening apparatus as claimed in claim 7, in which the selectively operable device comprises a variable-geometry aperture device.

12. A component having a laser shock peened surface region comprising a plurality of laser shock peened spots, at least one of the laser shock peened spots having a shape different from that of others of the shock peened spots and in which the laser shock peened surface region comprises laser shocked peened spots predominantly of a first shape, at least one laser shock peened spot at a perimeter region of the surface region having a second shape.

13. A component as claimed in claim 12, in which the perimeter region comprises the edge of a hole in the surface of the component.

14. A component as claimed in claim 12, in which the perimeter region is adjacent an edge of the component.

* * * * *